United States Patent
Negishi et al.

(10) Patent No.: US 7,269,839 B2
(45) Date of Patent: Sep. 11, 2007

(54) DATA DISTRIBUTION APPARATUS AND METHOD, AND DATA DISTRIBUTION SYSTEM

(75) Inventors: Shinji Negishi, Kanagawa (JP); Hideki Koyanagi, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 09/876,990

(22) Filed: Jun. 11, 2001

(65) Prior Publication Data

US 2002/0023269 A1 Feb. 21, 2002

(30) Foreign Application Priority Data

Jun. 14, 2000 (JP) ............................ P2000-178999

(51) Int. Cl.
*H04N 5/95* (2006.01)
*H04N 7/173* (2006.01)

(52) U.S. Cl. .............................. 725/88; 386/86; 725/93
(58) Field of Classification Search ................. 725/88; 386/86
See application file for complete search history.

(56) References Cited

U.S. PATENT DOCUMENTS

| 5,828,370 | A | * | 10/1998 | Moeller et al. ............. 715/720 |
| 6,029,045 | A | * | 2/2000 | Picco et al. .................... 725/34 |
| 6,144,702 | A | * | 11/2000 | Yurt et al. ............. 375/240.01 |
| 6,445,738 | B1 | * | 9/2002 | Zdepski et al. ........ 375/240.01 |
| 6,658,199 | B1 | * | 12/2003 | Hallberg ....................... 386/68 |
| 6,697,432 | B2 | * | 2/2004 | Yanagihara et al. ... 375/240.26 |
| 6,965,724 | B1 | * | 11/2005 | Boccon-Gibod et al. ...... 386/68 |

* cited by examiner

*Primary Examiner*—Hunter B. Lonsberry
(74) *Attorney, Agent, or Firm*—Rader, Fishman & Grauer PLLC

(57) ABSTRACT

A special playback controller receives a special playback request from a user. A data storage unit stores data. In response to the special playback request received by the special playback controller, a data converter converts the data stored in the data storage unit into special playback data according to the type of special playback operation. The special playback data converted by the data converter is transmitted to a decoding terminal via a multiplexer, a transmitter, and a communication line, thereby enabling the decoding terminal to perform the special playback operation.

12 Claims, 7 Drawing Sheets

DATA DISTRIBUTION APPARATUS AND METHOD, AND DATA DISTRIBUTION SYSTEM

BACKGROUND OF THE INVENTION

1. Field of the Invention

The present invention relates to a data distribution apparatus and method, and a data distribution system, for distributing multimedia data, such as moving picture data, via a network and for allowing a receiving terminal to play back the received multimedia data in a special mode.

2. Description of the Related Art

A conventional data distribution system for compressing and storing multimedia data, such as video data and audio data, and distributing such multimedia data via a transmission medium, and allowing a decoding terminal, which serves as a data receiving terminal, to receive, decode, and display the multimedia data is configured, such as that shown in FIG. 5. For a simple representation, a data distribution system for distributing only video data is shown in FIG. 5.

The conventional data distribution system shown in FIG. 5 is formed of a server 100 for transmitting video data and a decoding terminal 200 for receiving the video data transmitted from the server 100. In this data distribution system, the server 100 and the decoding terminal 200 are connected via a transmission medium 300, such as a communication line, and the video data is transmitted and received between the server 100 and the decoding terminal 200 via the transmission medium 300.

The server 100 includes a data storage unit 101 for storing video data, a special playback controller 102, and a transmitter 103, which transmits the video data to the decoding terminal 200.

The decoding terminal 200 includes a receiver 201, a decoder 202, and a special playback controller 203. The receiver 201 receives the video data transmitted from the transmitter 103 of the server 100. The decoder 202 decodes the received video data and outputs it to a display unit (not shown) so as to present the content of the video data to a user.

In the above-configured data distribution system, when performing a special playback operation, such as a fast-forward playback operation or an interrupting operation (pause), the user of the decoding terminal 200 inputs a special playback designation signal into the special playback controller 203. In response to this signal, the special playback controller 203 sends a special playback request to the special playback controller 102 of the server 100.

Then, the special playback controller 102 supplies a control signal S102 indicating the special playback request to the transmitter 103 according to the special playback request sent from the decoding terminal 200. The transmitter 103 then reads the special playback video data S101 from the data storage unit 101 according to the special playback request and sends it to the decoding terminal 200 via the transmission medium 300.

When the above-described data distribution system is employed in a home network, video data encoded in conformance with, for example, ISO/IEC13818-2 (MPEG-2video), is used. It is defined in ISO/IEC13818-2 that the video data must be encoded so as not to cause an overflow or an underflow in a decoder buffer, as shown in FIG. 6. The decoder buffer is referred to as a vbv buffer conforming to the MPEG standards.

More specifically, as shown in FIG. 6, it is necessary to encode each piece of video data with an individual decode time stamp (DTS) so as not to overflow the vbv buffer in excess of its buffer size (vbv_buffer_size) or cause an underflow in the vbv buffer. The video data is input into the vbv buffer at the transmission rate of the video data (indicated by the locus slope of the used portion of the vbv buffer) and is output from the vbv buffer in accordance with a decoding time (DTS).

There are two types of video frame encoding methods in compliance with ISO-IEC13818-2. In one method, Intra pictures (I-pictures) are encoded using data present in the frame itself. In the other method, Bidirectionally predictive pictures (B-pictures) and Predictive pictures (P-pictures) are encoded by utilizing an inter-frame motion prediction. In a conventional data distribution system, I-pictures to be encoded without using inter-frame motion prediction are used as the above-described special playback video data. The special playback data is formed of I-pictures, which are regularly contained in normal playback video data, and is used for a special playback operation.

In a conventional data distribution system, video data to be transmitted is packetized by using a transport stream (TS), which is defined in, for example, ISO/IEC13818-1 (MPEG-2 system), and the resulting packets are multiplexed with another type of data, such as audio data. According to ISO-IEC13818-1, a decoder model, such as that shown in FIG. 7, is used for decoding the TS.

The decoder model shown in FIG. 7 is formed of a switch 401 for selectively outputting a video packet from the input TS, a transport buffer (TB) 402, a multiplexing buffer (MB) 403, an elementary buffer (EB) 404, a video decoder (VD) 405, a reorder buffer 406, and a switch 407. A video packet is selected from the input TS by the switch 401 and is sent to the transport buffer 402 at the input rate, and further to the video decoder 405 via the multiplexing buffer 403 and the elementary buffer 404. The video packet is then decoded in the video decoder 405 and is output as video data.

In the above-configured decoder model, the buffer size of each buffer is determined, and the data transfer rate between buffers is also defined.

The elementary buffer 404 is equivalent to the vbv buffer used for video data. It is defined in ISO/IEC13818-1 that the video data must be packetized so as not to cause an overflow or an underflow in each buffer.

The transmission data, such as a TS, is transmitted by using protocols compatible with the transmission medium 300. For example, a TS which satisfies the standards of ISO/IEC13818-1 can be transmitted by an IEEE-1394 cable which conforms to IEEE-1394 standards according to a technique defined in the "Digital Interface for consumer audio/video equipment" of IES61883. According to MPEG-2-TS-over-1394, a TS which conforms to the MPEG2 standards is transmitted according to IEEE-1394 standards. It is proposed that the above-mentioned MPEG-2-TS-over-1394 be used in a home network for distributing the content stored in a server to a client, such as a television set, installed in a room.

In performing a special playback operation in the above-described conventional data distribution system, the server 100 transmits special video data prepared for a special playback operation via the transmission medium 300. When, for example, a fast-forward playback operation is performed as the special playback operation, video data formed of only I-pictures conforming to ISO-IEC13818-2 is transmitted. In this case, special playback video data different from the normal playback video data must be prepared in the data storage unit 101 of the server 100.

However, in order to transmit a TS via an IEEE-1394 cable according to a technique defined in IEC61883, such a TS must be defined in ISO/IEC13818-1.

If the special playback data is transmitted in a special distribution data format, the special decoding terminal 200 in accordance with such a distribution data format is required. For example, video data formed of only I-pictures conforming to ISO/IEC13818-2 is different from a normal playback video stream, which is encoded to satisfy the standards of the vbv buffer, and may cause an overflow or an underflow in the vbv buffer. Accordingly, there is a strong demand for a data distribution method which does not require the special server 100 and the special decoding terminal 200.

Additionally, according to a special data distribution method for a special playback operation, the decoding terminal 200 must have a decoding function for performing processing, not only for the normal playback operation, but also for the special playback operation, which makes the configuration of the decoding terminal 200 complicated. For example, when video data formed of only I-pictures conforming to ISO/IEC13818-2, which may cause an underflow in the vbv buffer, is transmitted to the decoding terminal 200 for performing a fast-forward playback operation, the decoding terminal 200 must deal with the following situation. If, even at a decoding time of a certain picture, the input data of such a picture is not entirely received, the decoding terminal 200 must use the data of, for example, the previous picture, in place of the missing data.

Moreover, in a home network system, a plurality of decoding terminals 200 may be connected to the server 100. In this case, a data transmission method usable in simply constructed decoding terminals 200 is demanded. However, such a method is not available according to a conventional technique.

SUMMARY OF THE INVENTION

Accordingly, in view of the above background, it is an object of the present invention to provide a data distribution apparatus and method, and a data distribution system, for allowing a special playback operation to be performed in a simply constructed decoding terminal.

In order to achieve the above object, according to one aspect of the present invention, there is provided a data distribution apparatus including a receiver for receiving a special playback request from an external source. A data storage unit stores data. A decoder reads the data from the data storage unit in response to the special playback request, and decodes the read data so as to generate a special playback signal. An encoder encodes the special playback signal generated by the decoder so as to generate special playback data. A transmitter transmits the special playback data obtained by the encoder to a data receiving terminal via a data transmission medium.

According to another aspect of the present invention, there is provided a data distribution apparatus including a receiver for receiving a special playback request from an external source. A data storage unit stores playback data, and also stores special playback data and splicing data, both of which are used for playing back the playback data in a special mode. A data switching unit reads the special playback data from the data storage unit in response to the special playback request received by the receiver, and reads the splicing data from the data storage unit according to a buffer state of a data receiving terminal. A transmitter transmits the special playback data or the splicing data from the data switching unit to the data receiving terminal via a transmission medium.

According to still another aspect of the present invention, there is provided a data distribution apparatus including a receiver for receiving a special playback request from an external source. A data storage unit stores playback data and splicing data. A decoder reads the playback data from the data storage unit in response to the special playback request, and decodes the read playback data so as to generate a special playback signal. An encoder encodes the special playback signal generated by the decoder so as to generate special playback data. A data switching unit selectively reads the special playback data obtained by the encoder and the splicing data read from the data storage unit according to a buffer state of a data receiving terminal. A transmitter transmits the special playback data or the splicing data from the data switching unit to the data receiving terminal via a transmission medium.

According to a further aspect of the present invention, there is provided a data distribution method including the steps of: receiving a special playback request from an external source; reading data stored in a data storage unit in response to the special playback request; decoding the read data so as to generate a special playback signal; encoding the generated special playback signal so as to generate special playback data; and transmitting the special playback data to a data receiving terminal via a transmission medium.

According to a yet further aspect of the present invention, there is provided a data distribution method for reading special playback data from a data storage unit to a receiving terminal, the data storage unit storing playback data, and also storing the special playback data and splicing data, both of which are used for playing back the playback data in a special mode. The data distribution method includes the steps of: receiving a special playback request from an external source; reading the special playback data from the data storage unit in response to the special playback request; reading the splicing data from the data storage unit according to a buffer state of the receiving terminal; and transmitting the special playback data or the splicing data to the receiving terminal via a transmission medium.

According to a further aspect of the present invention, there is provided a data distribution method for distributing special playback data by using playback data and splicing data stored in a data storage unit to a receiving terminal. The data distribution method includes the steps of: receiving a special playback request from an external source; reading the playback data from the data storage unit in response to the special playback request; decoding the read playback data so as to generate a special playback signal; encoding the generated special playback signal so as to generate special playback data; and reading the splicing data from the data storage unit according to a buffer state of the receiving terminal, and transmitting the encoded special playback data or the encoded splicing data to the receiving terminal via a transmission medium.

According to a further aspect of the present invention, there is provided a data distribution system for distributing data which includes special playback data from a data distribution apparatus to a terminal device. The data distribution apparatus includes: a receiver for receiving a special playback request from an external source; a data storage unit for storing playback data, and also storing special playback data and splicing data, both of which are used for playing back the playback data in a special mode; a data switching unit for reading the special playback data from the data storage unit in response to the special playback request received by the receiver, and for reading the splicing data from the data storage unit according to a buffer state of a data receiving terminal; and a transmitter for transmitting the special playback data or the splicing data from the data switching unit to the terminal device via a transmission medium. The terminal device includes: a receiver for receiving the data transmitted from the data distribution apparatus; and a decoder for decoding the data received by the receiver.

According to a further aspect of the present invention, there is provided a data distribution system for distributing data which includes special playback data from a data distribution apparatus to a terminal device. The data distribution apparatus includes: a receiver for receiving a special playback request from an external source; a data storage unit for storing playback data and splicing data; a decoder for reading the playback data from the data storage unit in response to the special playback request, and for decoding the read playback data so as to generate a special playback signal; an encoder for encoding the special playback signal generated by the decoder so as to generate special playback data; a data switching unit for selectively reading the special playback data obtained by the encoder and the splicing data read from the data storage unit according to a buffer state of a data receiving terminal; and a transmitter for transmitting the special playback data or the splicing data from the data switching unit to the terminal device via a transmission medium. The terminal device includes: a receiver for receiving the data transmitted from the data distribution apparatus; and a decoder for decoding the data received by the receiver.

According to the present invention, a special playback request is input from a user. Based on the special playback request, data stored in the data storage unit is converted into special playback data according to the type of special playback operation. The converted special playback data is then transmitted to a receiving terminal via a communication line. Thus, the receiving terminal is able to receive the special playback data and decodes it, thereby performing the special playback operation. Thus, the configuration of the decoding terminal can be simplified.

DESCRIPTION OF THE PREFERRED EMBODIMENTS

The present invention is described in detail below with reference to the accompanying drawings through illustration of a preferred embodiment.

Figure 1:
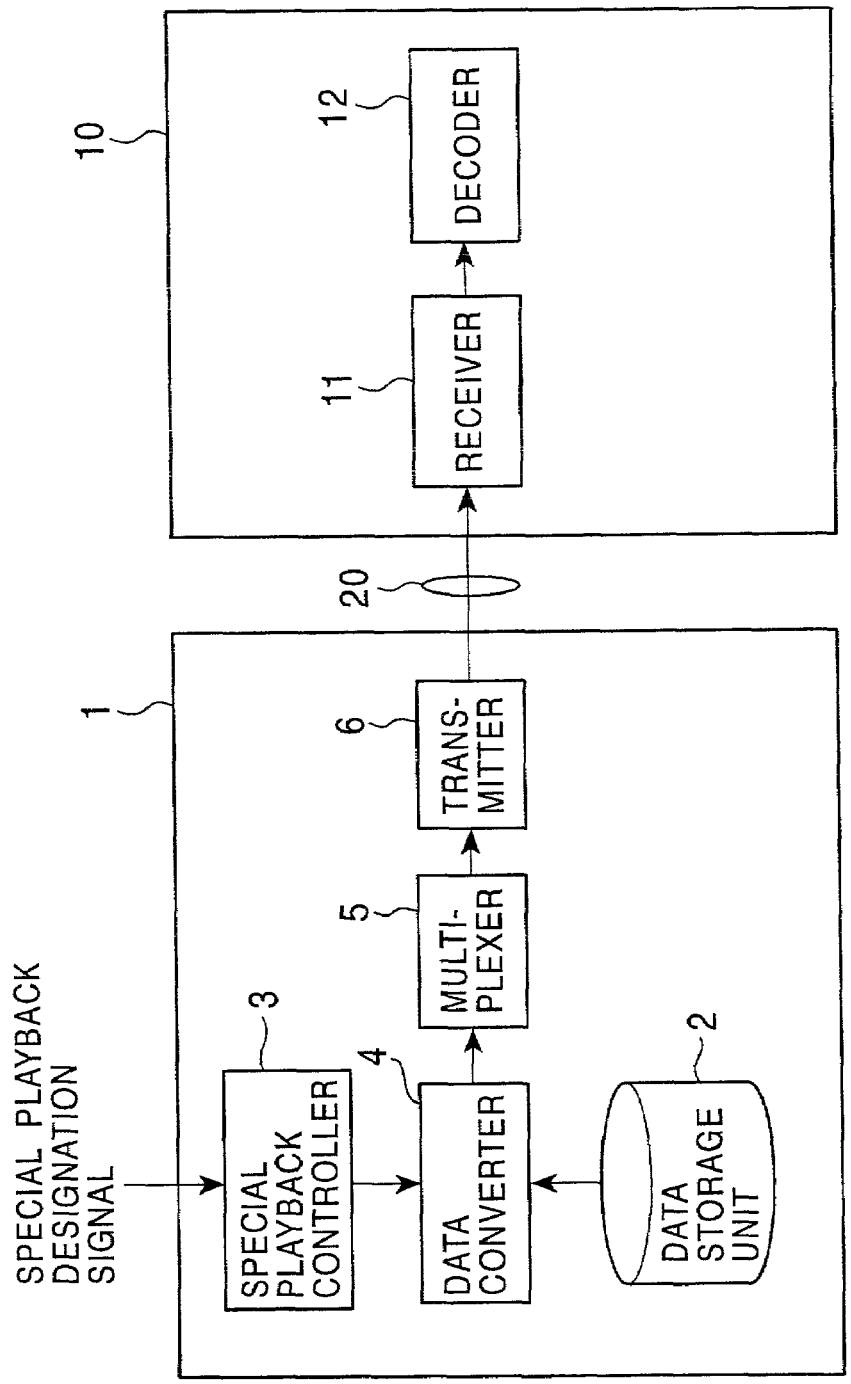
FIG. 1 is a block diagram illustrating the configuration of a data distribution system according to the present invention.

A data distribution system constructed in accordance with the present invention shown in FIG. 1 is formed of a server 1 for distributing stored data and a decoding terminal 10 connected to the server 1 via a transmission medium 20.

The server 1 includes a data storage unit 2 for storing data, a special playback controller 3, a data converter 4, a multiplexer 5, and a transmitter 6.

The data storage unit 2 stores video data to be transmitted from the server 1 to the decoding terminal 10 via the transmission medium 20. The data storage unit 2 outputs the video data to the data converter 4 in response to a request from the data converter 4.

In this embodiment, only the video data is stored in the data storage unit 2. However, other types of multimedia data, such as still image data, audio data, text data, and graphics data, may be stored.

A special playback designation signal indicating a request to perform a special playback operation is input into the special playback controller 3 by a user. The special playback designation signal indicates the type of special playback operation, such as a fast-forward playback or frame advance playback operation, and designates the video data stored in the data storage unit 2. The special playback controller 3 supplies a special playback control signal indicating the type of special playback operation and the designated video data to the data converter 4 based on the special playback designation signal.

According to the special playback control signal, the data converter 4 reads the designated video data from the data storage unit 2, and performs data conversion on the read video data according to the type of special playback operation. In this case, the data converter 4 converts the video data into special playback data reflecting the type of special playback operation while reading the video data from the data storage unit 2. The data converter 4 supplies the special playback data to the multiplexer 5.

The multiplexer 5 multiplexes the special playback data from the data converter 4 or the video data from the data storage unit 2 as required, and supplies the multiplexed data to the transmitter 6.

More specifically, the multiplexer 5 multiplexes the data from the data converter 4 in a data format compatible with the transmission medium 20 when the data is formed of a plurality of types of data, such as video data and audio data.

The transmitter 6 converts the special playback video data from the multiplexer 5 into a format compatible with the transmission medium 20, and sends it to the decoding terminal 10 via the transmission medium 20 as transmission data.

The decoding terminal 10 includes a receiver 11 connected to the server 1 via the transmission medium 20 and a decoder 12.

The receiver 11 receives the transmission data from the transmitter 6 of the server 1 via the transmission medium 20. The receiver 11 converts the transmission data in a format processable by the decoder 12, and supplies the converted data to the decoder 12 as the special playback video data.

The decoder 12 decodes the special playback video data received from the receiver 11 and outputs the decoded data to a display unit (not shown) so as to display the content of the special playback video data.

The specific configuration of the above-described data converter 4 is discussed below with reference to FIG. 2.

Figure 2:
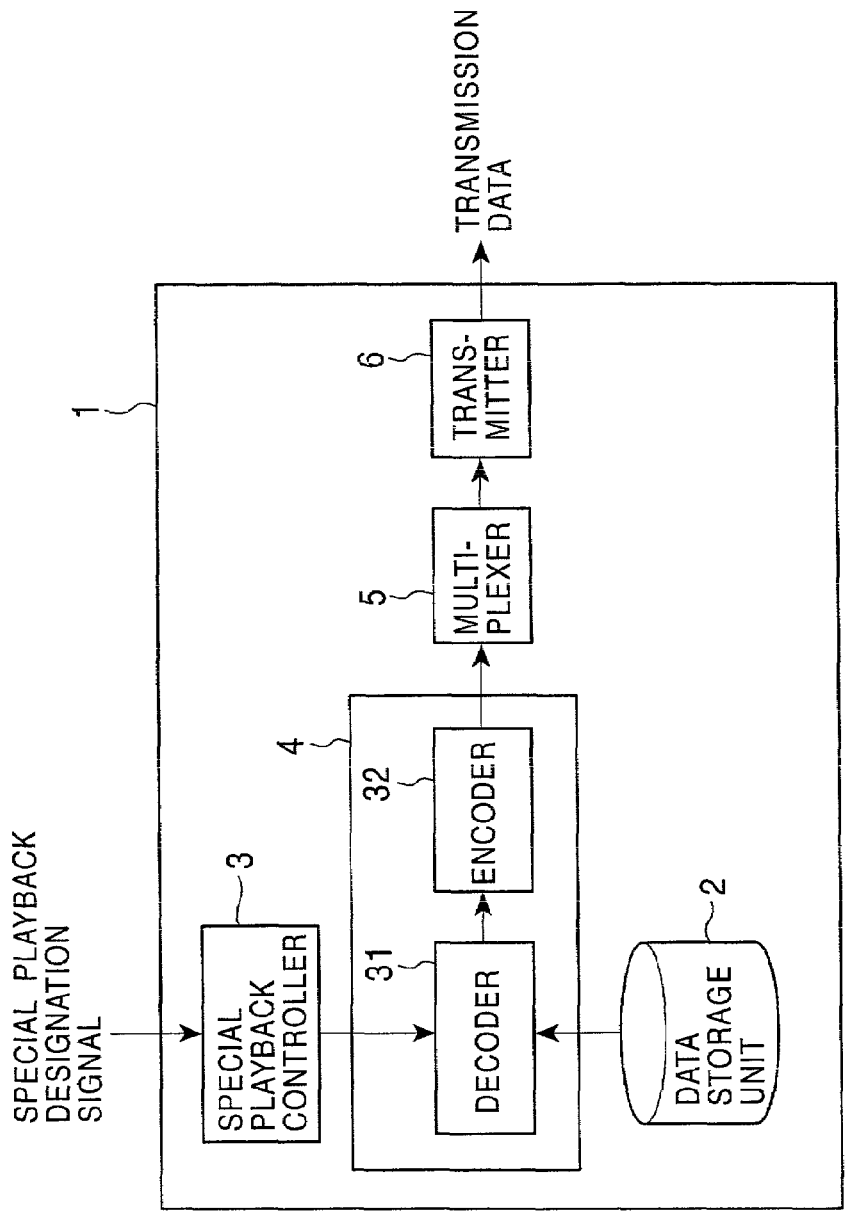
FIG. 2 is a block diagram illustrating one example of the specific configuration of a server shown in FIG. 1.

FIG. 2 illustrates an example of the configuration of the server 1 including the data converter 4. The data converter 4 includes a decoder 31 for receiving the special playback control signal from the special playback controller 3 and also reading video data from the data storage unit 2, and an encoder 32 for converting the data decoded in the decoder 31.

The decoder 31 reads the designated video data from the data storage unit 2 based on the special playback control signal from the special playback controller 3 according to a reading method optimal for the type of special playback operation. For example, in response to the special playback control signal indicating a request of a fast-forward playback operation, the decoder 31 reads the video data from the data storage unit 2 by skipping B-pictures, which are not required for decoding.

The decoder 31 then decodes the read video data and supplies it to the encoder 32 as a decoded video signal. The decoded video signal reflects the result of the special playback operation.

The encoder 32 encodes the decoded video signal and outputs it to the multiplexer 5 as special playback video data. The special playback video data output from the encoder 32 is optimal for the type of special playback operation. For example, when the video data output from the decoder 31 is encoded in compliance with ISO/IEC13818-2, the special playback video data output from the encoder 32 satisfies the standards of ISO/IEC13818-2.

In the above-described data distribution system, even when a special playback operation is performed, the special playback data is converted into a video data format similar to that in a normal playback operation by the data converter 4. This obviates the need for special receiving or decoding processing in the decoding terminal 10, and also, a special playback controller is not required for the decoding terminal 10.

Additionally, when, for example, ISO/IEC13818-2 is used, the data converter 4 is able to perform control so as to prevent an overflow or an underflow in the vbv buffer while converting the normal playback video data into the special playback video data. Accordingly, the decoding terminal 10 can be simply constructed without the need for performing processing for the special playback operation.

As stated above, the data format of the special playback video data is similar to that of the normal playback video data. This also eliminates the need for the data converter 4 to possess a function of converting the data format into a special format. Since the special playback video data does not cause an overflow or an underflow in the vbv buffer, it can be multiplexed into a TS which satisfies the standards of ISO/IEC13818-1. The TS can be transmitted in a data format which satisfies the standards of IEC61883 via an IEEE-1394 cable used as the transmission medium 20.

Thus, according to the aforementioned data distribution system, a special server and a special decoding terminal are not required for transmitting special playback video data.

In the server 1 shown in FIG. 2, it is not necessary to store the special playback video data in the data storage unit 2 separately from the normal playback video data, thereby reducing the storage capacity of the data storage unit 2.

Another example of the specific configuration of the data converter 4 is described below with reference to FIG. 3.

Figure 3:
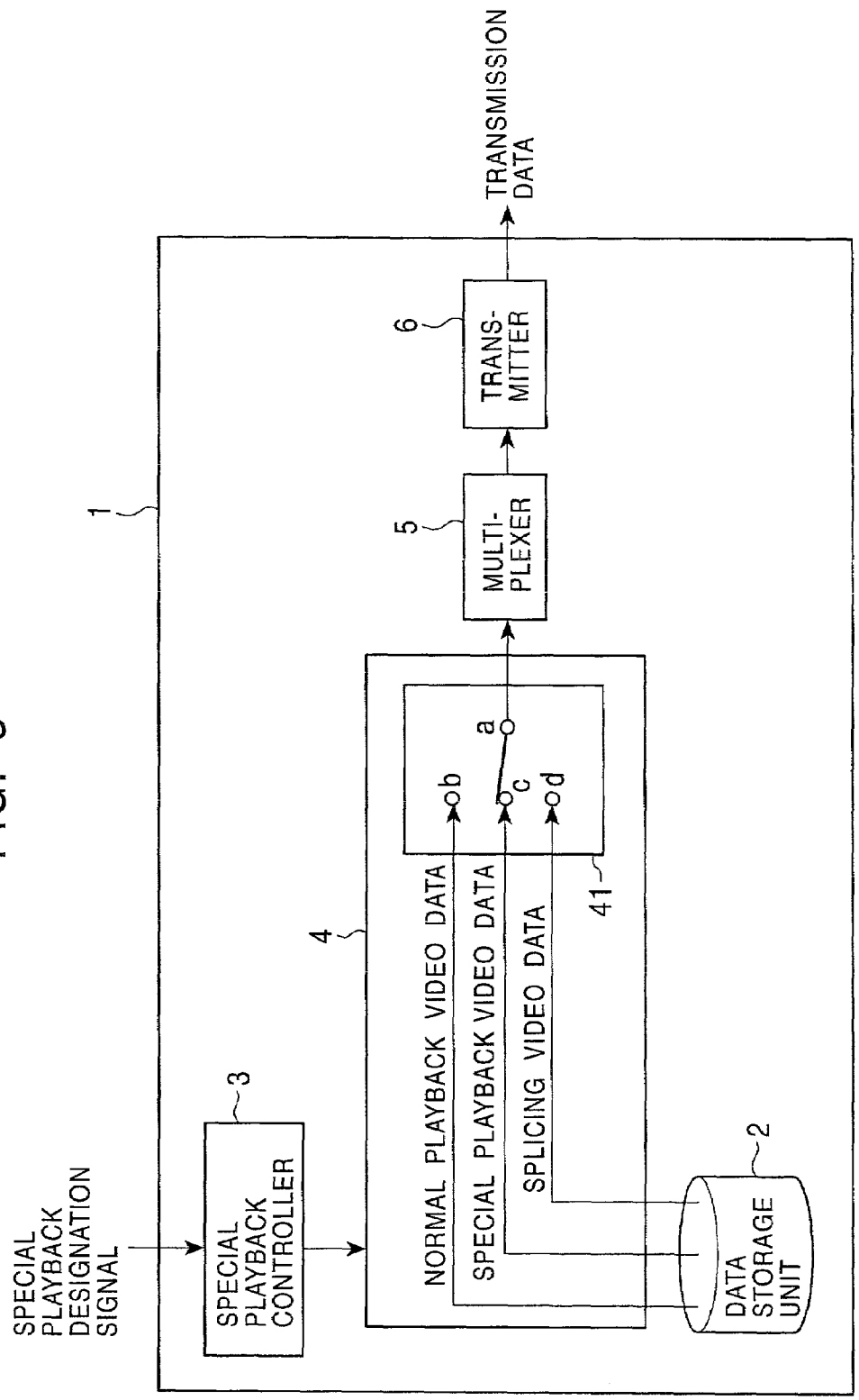
FIG. 3 is a block diagram illustrating another example of the specific configuration of the server shown in FIG. 1.

FIG. 3 illustrates the configuration of the server 1 including the data converter 4. The data converter 4 includes a switch 41 for selectively outputting data stored in the data storage unit 2 to the multiplexer 5. In the server 1 shown in FIG. 3, normal playback video data for performing a normal playback operation, special playback video data for performing a special playback operation, and splicing video data for preventing an overflow or an underflow in a vbv buffer are stored in the data storage unit 2.

When performing the normal playback operation in the decoding terminal 10, the switch 41 reads the normal playback video data from the data storage unit 2 via an input terminal b, and outputs it to the multiplexer 5 via an output terminal a.

In response to the special playback control signal from the special playback controller 3, the switch 41 reads the designated special playback video data from the data storage unit 2 via an input terminal c according to the type of special playback operation. The switch 41 then outputs the read special playback video data to the multiplexer 5 via the output terminal a.

When selectively outputting different types of video data, or when switching between the normal playback video data and the special playback video data, the switch 41 reads the splicing video data from the data storage unit 2 as required via an input terminal d, and outputs it to the multiplexer 5 via the output terminal a.

The switch 41 has the function of selectively outputting a plurality of types of data read from the data storage unit 2 according to the operation on a bit stream. For example, if the video data defined in ISO/IEC13818-2 is input, and different types of data are selectively output from the switch 41, the locus of one type of data in the vbv buffer does not match that of another type of data. This may cause an overflow or an underflow in the vbv buffer at the switched portion of data. Thus, when selectively outputting the normal playback video data and the special playback video data, the switch 41 inserts the splicing video data into the switched portion by using a data switching technique used in a broadcast station or a splicing technique used in editing so that the locus of the used bits of the vbv buffer can be continuous.

For example, if the normal playback video data or the special playback video data input into the switch 41 is defined in ISO/IEC13818-2, the splicing video data is a B-picture or an I-picture which is the same as the video frame immediately before the data is switched. Such a B-picture or an I-picture is referred to as a "repeat picture". The data size of the repeat picture is much smaller than that of an I-picture. Accordingly, the data size of the repeat picture can be adjusted by embedding stuffing bytes in the repeat picture so that the locus of the data which occupies the vbv buffer before and after the switching operation can be continuous. Thus, even when video data is switched regardless of whether it is normal playback video data or special playback video data, the video data output from the switch 41 to the multiplexer 5 satisfies the standards of ISO/IEC13818-2.

In the server 1 shown in FIG. 3, video data is switched by the switch 41 and is transmitted to the multiplexer 5. However, another type of multimedia data may be switched and output. For example, multiplexed data, such as a TS format of ISO/IEC13818-1, may be stored in the data storage unit 2, and may be spliced by the switch 41.

Thus, even if a special playback designation signal is input from the user into the server 1 shown in FIG. 3, the special playback video data can be transmitted, as in the normal playback video data, thereby allowing the decoding terminal 10 to perform the special playback operation. This eliminates the need for providing a special function of performing a special playback operation for the decoding terminal 10. Thus, the configuration of the decoding terminal 10 can be simplified.

It is also not necessary to decode or re-encode the video data in the server 1, thereby simplifying the configuration of the data converter 4, and also inhibiting a processing delay before the data is transmitted.

Still another example of the specific configuration of the data converter 4 is discussed below with reference to FIG. 4.

Figure 4:
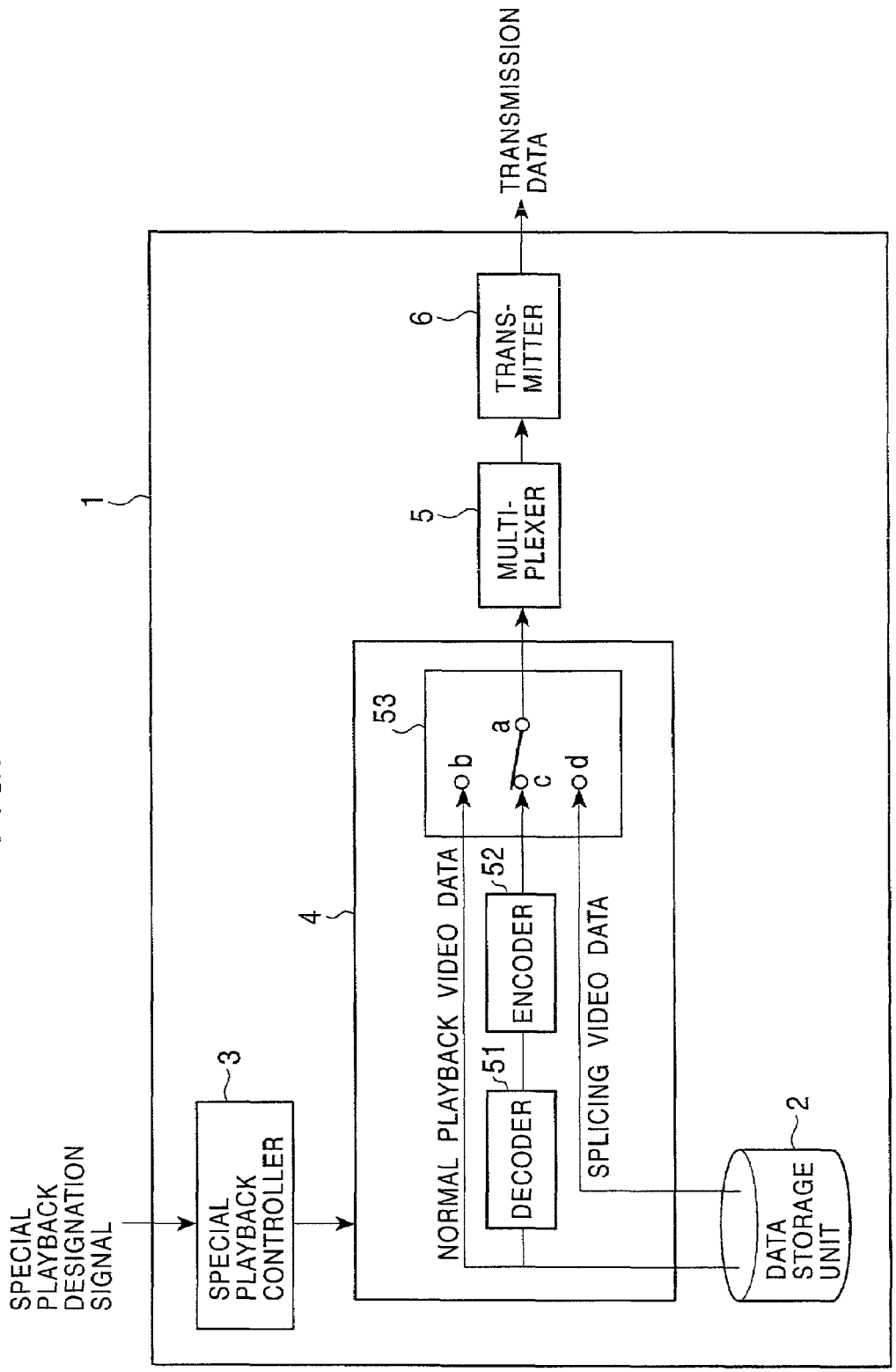
FIG. 4 is a block diagram illustrating still another example of the specific configuration of the server shown in FIG. 1.
Figure 5:
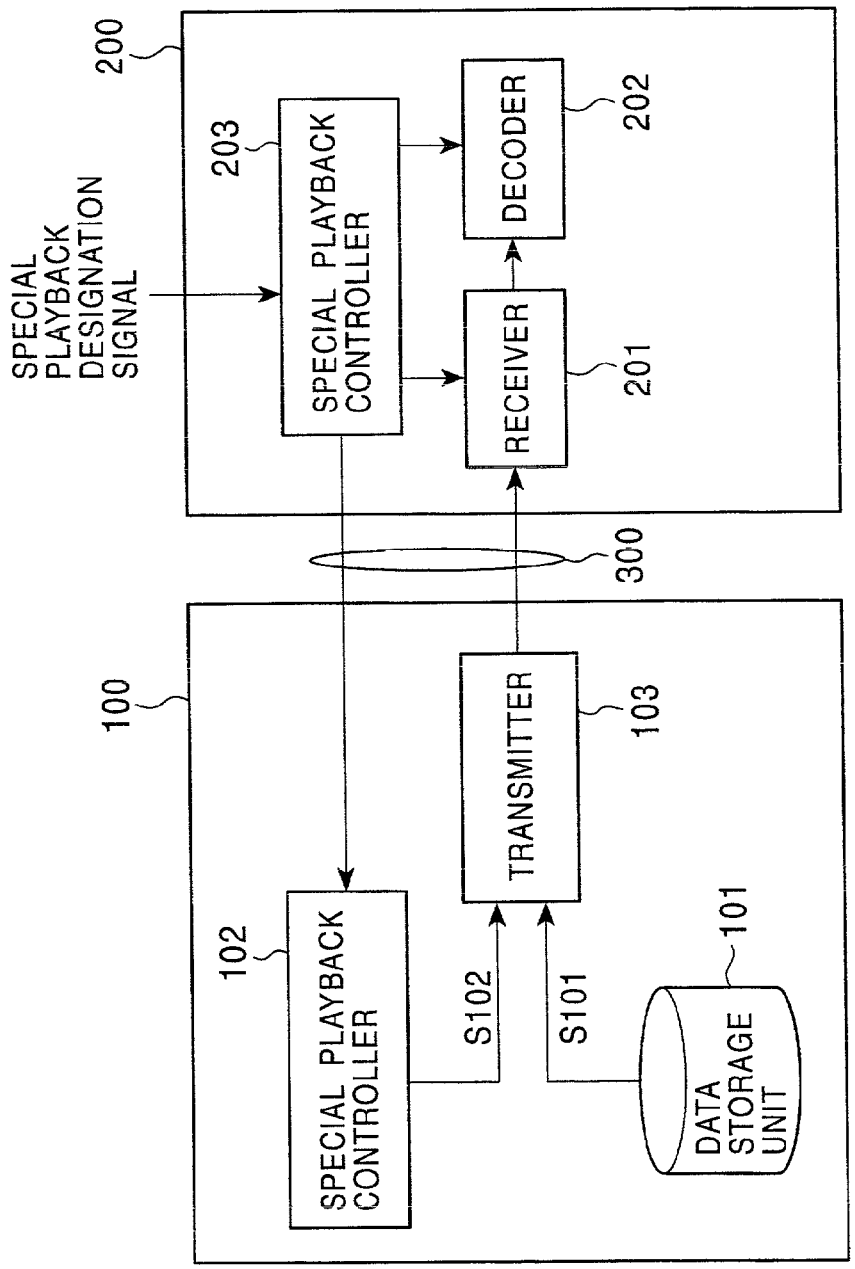
FIG. 5 is a block diagram illustrating a conventional data distribution system.
Figure 6:
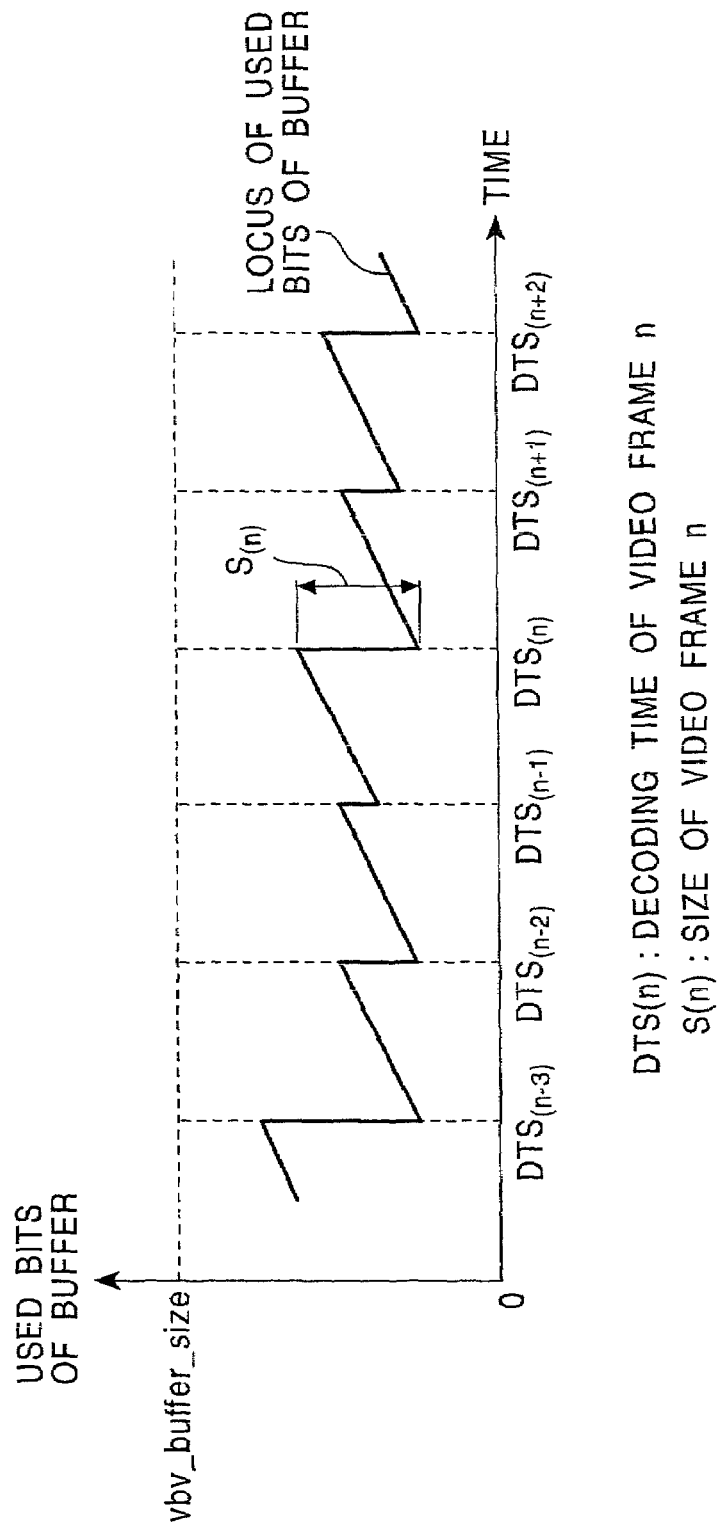
FIG. 6 illustrates a vbv buffer.
Figure 7:
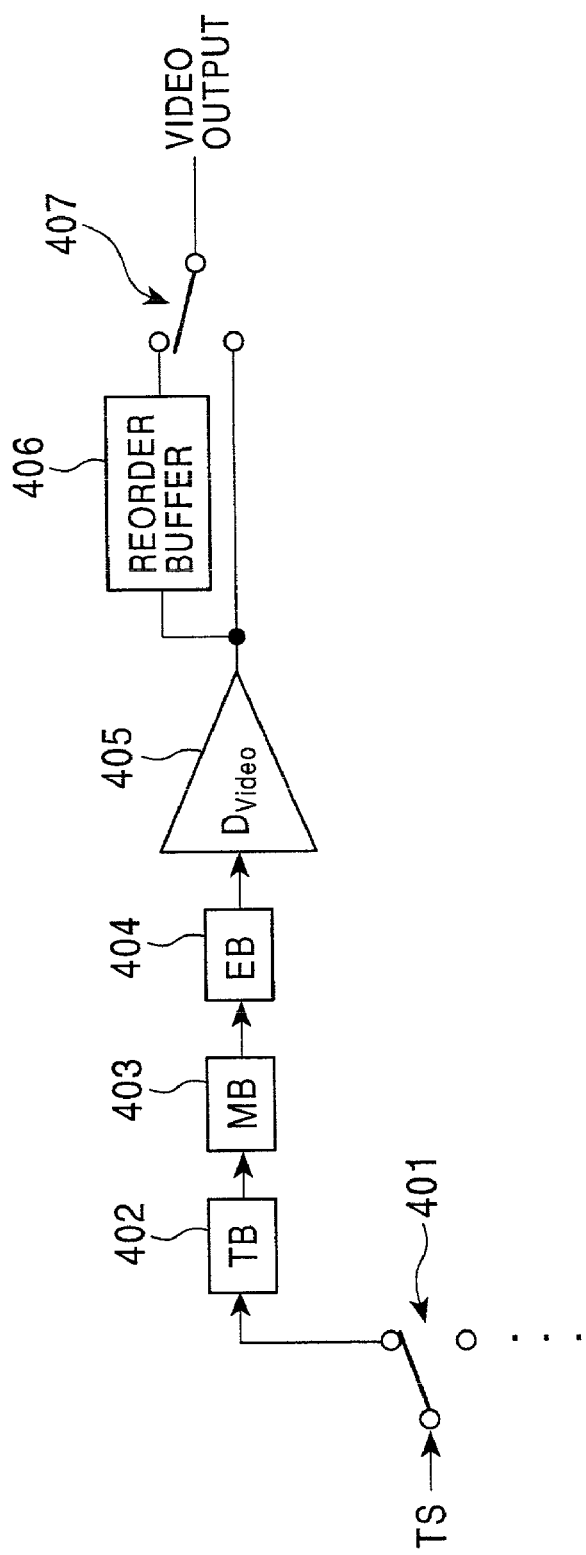
FIG. 7 illustrates a decoder model for decoding a TS according to ISO/IEC13818-1.

FIG. 4 illustrates the server 1 including the data converter 4. The data converter 4 includes a decoder 51, an encoder 52, and a switch 53. In the server 1 shown in FIG. 4, normal playback video data for performing a normal playback operation and splicing video data for preventing an overflow or an underflow in the vbv buffer are stored in the data storage unit 2.

In response to a special playback control signal from the special playback controller 3, the decoder 51 reads the designated normal playback video data from the data storage unit 2 according to a reading technique optimal for the type of special playback operation. For example, if a special playback control signal indicating a request of the fastforward playback operation is input, the decoder 51 reads the normal playback video data from the data storage unit 2 by skipping B pictures, which are not used for decoding.

The decoder 51 decodes the read normal playback video data and supplies it to the encoder 52. The decoded video signal reflects the result of the special playback operation.

The encoder 52 then encodes the decoded video signal output from the decoder 51, and outputs it to the switch 53 as the special playback video data. The special playback video data output from the encoder 52 reflects the type of special playback operation. For example, when the video data is encoded in compliance with ISO/IEC13818-2, the resulting special playback video data output from the encoder 52 satisfies the standards of ISO/IEC13818-2.

When the normal playback operation is performed in the decoding terminal 10, the switch 53 reads the normal playback video data from the data storage unit 2 via an input terminal b, and outputs it to the multiplexer 5 via an output terminal a.

In response to a special playback control signal from the special playback controller 3, the switch 53 receives the special playback video data from the encoder 52 via an input terminal c, and outputs it to the multiplexer 5 via the output terminal a.

When selectively outputting different types of data, or when switching between the normal playback video data and the special playback video data, the switch 53 reads the splicing video data from the data storage unit 2 as required via an input terminal d, and outputs it to the multiplexer 5 via the output terminal a.

Unlike the example shown in FIG. 2, in the server 1 shown in FIG. 4, the decoding and encoding operation is not required when performing the normal playback operation, thereby reducing a processing delay.

Unlike the example shown in FIG. 3, according to the server 1 shown in FIG. 4, it is not necessary to store the special playback video data in the data storage unit 2, thereby reducing the storage capacity of the data storage unit 2. This also makes it possible to use the server 1 shown in FIG. 4 as a home-use server to which special playback video data is not supplied, such as television broadcasts.

What is claimed is:

1. A data distribution apparatus comprising:
   receiving means for receiving a request signal from an external source;
   data storage means for storing playback data and splicing data;
   data switching means for selectively outputting the playback data, special playback data and the splicing data in response to the request signal received by said receiving means; and
   transmission means for transmitting the playback data, the special playback data or the splicing data from said data switching means to a data receiving terminal via a transmission medium,
   wherein the data switching means generates the special playback data by reading selected playback data from said data storage means in response to a type of special playback, decoding the selected playback data, and encoding the decoded special playback data when the request signal indicates the special playback, and
   wherein the data switching means selectively outputs the splicing data from said data storage means when switching between the playback data and the special playback data so as to provide a continuity in the locus of used bits in a buffer of a data receiving terminal to prevent an overflow or an underflow in the buffer of the data receiving terminal.

2. A data distribution apparatus according to claim 1, wherein the splicing data comprises repeat data which is equivalent to data positioned immediately before the splicing data.

3. A data distribution apparatus comprising:
   receiving means for receiving a request signal from an external source;
   data storage means for storing playback data and splicing data;
   decoding means for reading the playback data from said data storage means in response to a type of special playback corresponding to the request signal, and for decoding the read playback data so as to generate a special playback signal;
   encoding means for encoding the special playback signal generated by said decoding means so as to generate special playback data;
   data switching means for selectively outputting the playback data, the special playback data obtained by said encoding means and the splicing data read from said data storage means in response to the request signal received by said receiving means, wherein the data switching means selectively outputs the splicing data from said data storage means when switching between the playback data and the special playback data so as to provide a continuity in the locus of used bits in a buffer of a data receiving terminal to prevent an overflow or an underflow in a buffer of the data receiving terminal; and
   transmission means for transmitting the playback data, the special playback data or the splicing data to the data receiving terminal via a transmission medium.

4. A data distribution apparatus according to claim 3, wherein the splicing data comprises repeat data which is equivalent to data positioned immediately before the splicing data.

5. A data distribution method for reading special playback data from a data storage unit to a receiving terminal, said data storage unit storing playback data, and also storing the special playback data and splicing data, both of which are used for playing back the playback data in a special mode, said data distribution method comprising the steps of:
   receiving a request signal from an external source;
   reading the playback data from said data storage unit in response to a special playback corresponding to the request signal;

decoding the playback data so as to generate a special playback signal, and encoding the special playback signal so as to generate special playback data, wherein the special playback data is generated in response to a type of special playback;

selectively outputting the playback data, the special playback data obtained by encoding the special playback signal, and the splicing data in response to the request signal received by said receiving means, wherein said selectively outputting selectively outputs the splicing data from said data storage unit when switching between the playback data and the special playback data so as to provide a continuity in the locus of used bits in a buffer of a receiving terminal to prevent an overflow or an underflow in the buffer of the receiving terminal; and transmitting the playback data, the special playback data or the splicing data to the receiving terminal via a transmission medium.

6. A data distribution system for distributing data which includes special playback data from a data distribution apparatus to a terminal device, said data distribution apparatus comprising:

receiving means for receiving a request signal from an external source;

data storage means for storing playback data, and splicing data;

data switching means for selectively outputting the playback data, the special playback data and the splicing data in response to the request signal received by said receiving means; and transmission means for transmitting the playback data, the special playback data or the splicing data from said data switching means to said terminal device via a transmission medium, wherein the data switching means generates the special playback data by reading selected playback data from said data storage means in response to a type of special playback, decoding the selected playback data, and encoding the decoded special playback data when the request signal indicates the special playback, and wherein the data switching means selectively outputs the splicing data from said data storage means when switching between the playback data and the special playback data so as to provide a continuity in the locus of used bits in a buffer of the terminal device to prevent an overflow or an underflow in the buffer of the terminal device, and said terminal device comprising:

receiving means for receiving the data transmitted from said data distribution apparatus; and decoding means for decoding the data received by said receiving means.

7. A data distribution system for distributing data which includes special playback data from a data distribution apparatus to a terminal device, said data distribution apparatus comprising:

receiving means for receiving a request signal from an external source;

data storage means for storing playback data and splicing data;

decoding means for reading the playback data from said data storage means in response to the a type of special playback corresponding to the request signal, and for decoding the read playback data so as to generate a special playback signal;

encoding means for encoding the special playback signal generated by said decoding means so as to generate special playback data;

data switching means for selectively outputting the playback data, the special playback data obtained by said encoding means and the splicing data read from said data storage means in response to the request signal received by said receiving means, wherein the data switching means selectively outputs the splicing data from said data storage means when switching between the playback data and the special playback data so as to provide a continuity in the locus of used bits in a buffer of a data receiving terminal to prevent an overflow or an underflow in the buffer of the data receiving terminal; and transmission means for transmitting the playback data, the special playback data or the splicing data from said data switching means to said terminal device via a transmission medium, and said terminal device comprising:

receiving means for receiving the data transmitted from said data distribution apparatus; and decoding means for decoding the data received by said receiving means.

8. The apparatus of claim 1, wherein the special playback data is intra-frame encoded, and the playback data is substantially inter-frame predictive encoded.

9. The apparatus of claim 3, wherein the special playback data is intra-frame encoded, and the playback data is substantially inter-frame predictive encoded.

10. The method of claim 5, wherein the special playback data is intra-frame encoded, and the playback data is substantially inter-frame predictive encoded.

11. The system of claim 6, wherein the special playback data is intra-frame encoded, and the playback data is substantially inter-frame predictive encoded.

12. The system of claim 7, wherein the special playback data is intra-frame encoded, and the playback data is substantially inter-frame predictive encoded.

* * * * *